(12) United States Patent
Eakins

(10) Patent No.: US 9,696,130 B1
(45) Date of Patent: Jul. 4, 2017

(54) GARMENT PROPERTY DETERMINATION USING ROBOTIC MANNEQUIN

(71) Applicant: Amazon Technologies, Inc., Reno, NV (US)

(72) Inventor: Harry James Lewis Eakins, Lancashire (GB)

(73) Assignee: Amazon Technologies, Inc., Reno, NV (US)

( * ) Notice: Subject to any disclaimer, the term of this patent is extended or adjusted under 35 U.S.C. 154(b) by 304 days.

(21) Appl. No.: 14/099,396

(22) Filed: Dec. 6, 2013

(51) Int. Cl.
  *H04N 7/18* (2006.01)
  *G01B 5/02* (2006.01)
  *A47F 8/00* (2006.01)

(52) U.S. Cl.
  CPC . *G01B 5/02* (2013.01); *A47F 8/00* (2013.01)

(58) Field of Classification Search
  CPC ...... G01B 11/022; G01B 11/024; H04N 7/18; H04N 7/181; G01C 15/00
  USPC .......................................... 348/135; 702/138
  See application file for complete search history.

(56) References Cited

U.S. PATENT DOCUMENTS

| | | | | |
|---|---|---|---|---|
| 4,424,922 A | * | 1/1984 | Zuckerman | A47G 25/20 223/88 |
| 4,838,886 A | * | 6/1989 | Kent | A61F 13/49004 2/111 |
| 5,732,859 A | * | 3/1998 | LeBlanc | D06F 73/02 223/66 |
| 8,605,148 B2 | * | 12/2013 | Robertson | H04N 5/275 348/135 |
| 2004/0122393 A1 | * | 6/2004 | Morman | A61F 13/4902 604/369 |
| 2005/0051581 A1 | * | 3/2005 | Nan | A47F 8/00 223/67 |
| 2005/0234782 A1 | * | 10/2005 | Schackne | G06Q 30/0601 705/26.1 |
| 2008/0262944 A1 | * | 10/2008 | Wu | G06Q 30/0603 705/27.2 |
| 2010/0016681 A1 | * | 1/2010 | Charles, Jr. | A61L 35/0002 600/301 |
| 2010/0085318 A1 | * | 4/2010 | Lee | G06F 3/04883 345/173 |
| 2013/0238285 A1 | * | 9/2013 | Volchek | A41H 5/01 702/188 |

OTHER PUBLICATIONS

"About Fits.me", retrieved on Dec. 6, 2013 from <<http://fits.me/about/about-fits-me/>>, Fits.me, 4 pages.

(Continued)

*Primary Examiner* — William Tran
(74) *Attorney, Agent, or Firm* — Lee & Hayes, PLLC

(57) ABSTRACT

Apparatuses, systems, and methods for garment property determination are disclosed. One or more movable portions of a mannequin are adjusted, thereby causing the mannequin to change from a first size to a second size. Signals are received from one or more sensors of the mannequin, and pressure readings applied to at least one location on an exterior surface of the mannequin are determined from the signals. Data that correlates at least a first pressure reading with the first size of the mannequin and that correlates at least a second pressure reading with the second size of the mannequin are stored.

19 Claims, 8 Drawing Sheets

(56) References Cited

OTHER PUBLICATIONS

Smith, "Our virutal Fitting Rooms Just Got a Lot Less Complex", retreived on Dec. 6, 2013 at <<http://fits.me/about/about-fits-me/>>, Fits.me, Oct. 2, 2013, 5 pages.

Office Action for U.S. Appl. No. 14/099,211, mailed on Dec. 3, 2015, Eakins, "Automated Garment Photography With Fit Adjustment", 14 pages.

Office action for U.S. Appl. No. 14/099,211, mailed on May 20, 2016, Eakins, "Automated Garment Photography With Fit Adjustment", 18 pages.

* cited by examiner

GARMENT PROPERTY DETERMINATION USING ROBOTIC MANNEQUIN

RELATED APPLICATION

This application is related to concurrently filed U.S. patent application Ser. No. 14/099,211, entitled "AUTOMATED GARMENT PHOTOGRAPHY WITH FIT ADJUSTMENT."

BACKGROUND

Online shopping has transformed retail in many areas. But apparel is one area where consumers have not fully adopted the online shopping model. Clothing returns are high, and it is believed that many customers abandon online clothing purchases prior to completing them. As a result, some online retailers have generous return policies for clothing that does not fit in order to make the customer more comfortable with purchasing clothing online.

Compounding this problem is the fact that there is no size standardization in the apparel industry. For example, a size "8" from one clothing manufacturer is not necessarily the same as a size "8" from another manufacturer, making it difficult for a consumer to know whether a garment purchased online will fit. Also, a pant size reported by the manufacturer to be 32 inches in the waist and 34 inches in the inseam does not provide information about how much room the pants have in the thigh, for example.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

Overview

Figure 1:
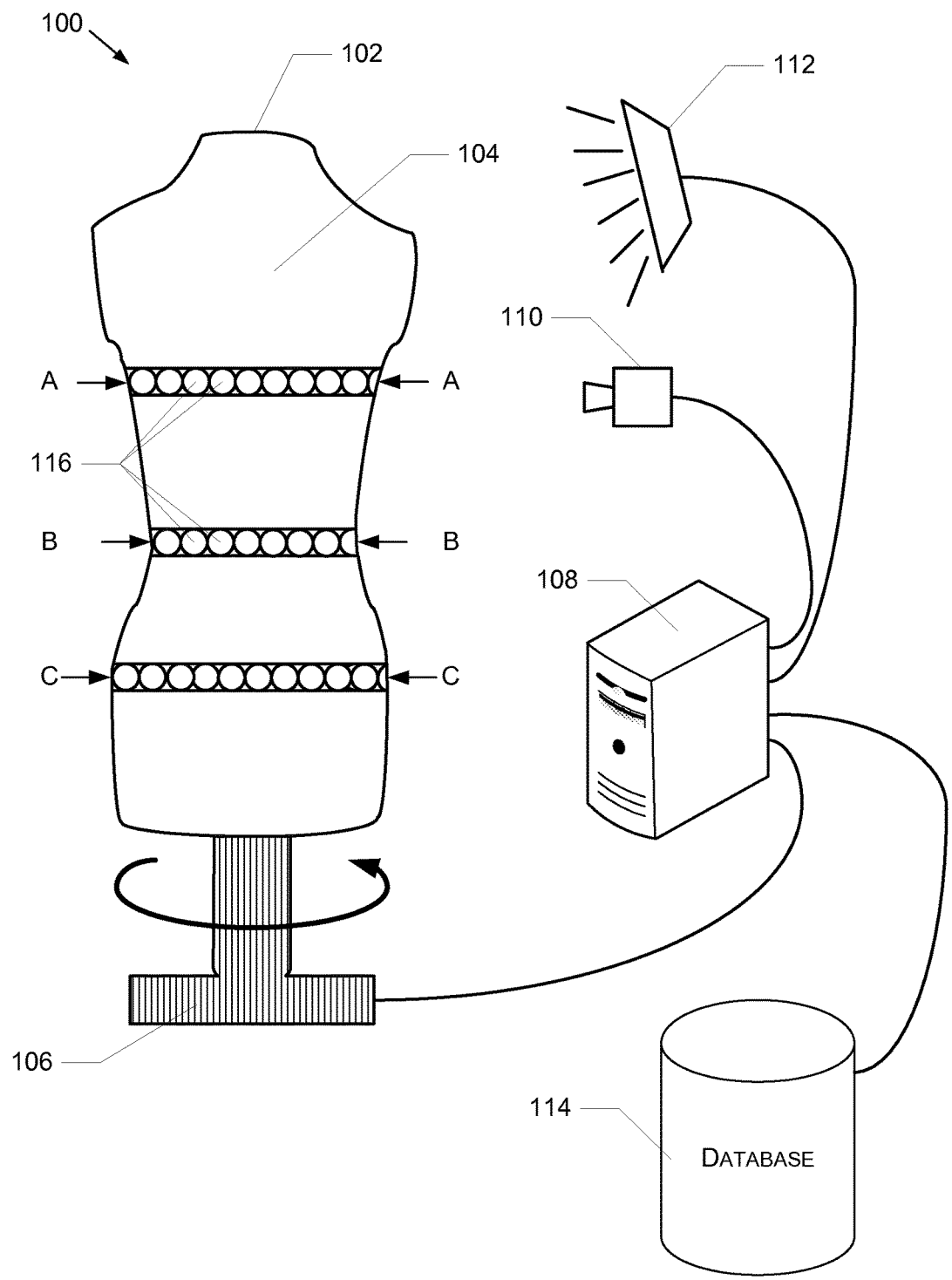
FIG. 1 shows a garment documentation system having a mannequin with adjustable portions and a plurality of sensors.

Embodiments include a garment documentation system that includes a robotic mannequin. The robotic mannequin is equipped with mechanisms, such as electric motors, hydraulic systems, magnets, or other mechanisms, that are controllable to cause the mannequin to assume a variety of sizes in various dimensions. The robotic mannequin is therefore able to emulate various body sizes, such as human body sizes. In one example, various attribute sizes of the robotic mannequin, such as a hip size, a waist size, a chest size, and so forth, are adjustable. The robotic mannequin, according to some embodiments, also includes one or more pressure sensors that detect pressure exerted on the exterior surface of the mannequin, such as by a garment placed on the mannequin. The robotic mannequin enables garment documentation of various kinds, such as automated photography of the garment as well as garment property determination including determination of garment size and elasticity.

The robotic mannequin, in some embodiments, enables photographs of a garment placed onto the mannequin to be taken in an automated fashion. The various mannequin dimensions—which may include for example hip size, chest size, waist size, and so forth—are progressively adjusted to assume a variety of size combinations while the garment remains placed on the mannequin. At each individual mannequin size combination, one or more photographs of the garment are captured, stored, and correlated with the mannequin size combination.

In this way, photographs of the garment are captured under a range of mannequin size combinations, and the photographs are searchable and retrievable based on mannequin size. During an online shopping experience, a user is able to view one or more photographs of the garment placed onto a mannequin that assumes a particular body size, such as the same or similar size as the user. This facilitates a visual determination, by the user, as to whether the garment is a good fit for his or her body size. Automated garment photography as described herein enables a very large catalog of garments to be photographed. For example, in one test, it took a stylist manually operating a mannequin and a camera four hours to photograph a single garment under different size combinations. In contrast, it is estimated that automated garment photography as described herein enables a single employee to photograph 3000-4000 pieces of clothing per year.

The garment documentation system may activate a fit adjustment mechanism, such as a fan or a series of wires attached to the garment, in order to adjust the placement of the garment on the mannequin during the garment documentation process. The fit adjustment mechanism may adjust the placement of the garment depending on the angle from which the garment is photographed. For example, a first adjustment may be made when photographing the garment from the front, while a second adjustment may be made when photographing the garment from the rear. Also, as the mannequin expands in size, the garment may shift on the mannequin; for example, the garment may ride up the mannequin's hips in an unflattering way. A fit adjustment mechanism enables correction of this problem.

As noted above, the robotic mannequin is equipped with a plurality of pressure sensors that detect pressure exerted at various locations on the exterior surface of the robotic mannequin. The pressure sensors are therefore able to detect the pressure exerted by the garment placed on the mannequin. During garment documentation, the pressure sensors of the mannequin may be used for various applications in various embodiments. For example, the pressure sensors are used in some embodiments to detect that a placement of the garment on the mannequin is deficient in some way, such as for example when the garment has ridden up the mannequin due to a change in the mannequin's size. In some embodiments, a fit adjustment mechanism is activated based on pressure sensor data. In other embodiments, fit adjustment is used upon determining that a garment has a styling issue, such as an unattractive crease or shadow.

Another application enabled by pressure sensors is determination of garment properties. As the mannequin expands (or contracts) in size, the garment documentation system detects changes in pressure at various locations on the exterior surface of the mannequin, which may indicate a size of the mannequin that causes the garment to press against the mannequin. Based on these pressure readings, the garment documentation system determines or estimates a garment size and/or a body size that fits the garment in various dimensions—for example the chest size, shoulder size, hip size, waist size, thigh size, neck size, etc. of the garment or estimated body fit. Also, based on detected changes in pressure at different mannequin sizes, garment elasticity is determined in some embodiments.

The garment documentation system may also identify one or more photographs taken of the garment—such as using the automated photography process described above—during a time that the mannequin that assumes a size combination that is a good or close fit for the garment. For example it may be determined that the closest fit for a particular dress is a 34 inch hip, 29 inch waist, and a 36 inch chest. One or more photographs of the garment captured while the mannequin assumes that particular size combination are identified. The identified photographs are used as model photographs for the garment for various purposes (such as for an online products detail page for the garment), since it may be more flattering than other photographs of the garment taken while the mannequin assumes other sizes. Also, the various documentation procedures described herein are practiced together in various embodiments. Automated photography of a garment may therefore take place while the garment's properties (size, fit, elasticity, etc.) are determined, so that the garment is placed onto the mannequin for less time. In these embodiments, fit adjustment enables the capturing of aesthetically pleasing photographs of the garment as well as ensuring proper pressure readings of the garment are detected for more accurate garment property determination.

Embodiments of the present disclosure, which are described in more detail below, therefore enable both human-process-able data such as photographs and machine-process-able data such as pressure readings to be documented for garments, in order to facilitate various uses.

Illustrative Environment

FIG. 1 shows a garment documentation system 100 having a mannequin 102 with adjustable portions and a plurality of sensors. The mannequin 102 is controllable to individually adjust one or more size attributes. The mannequin 102 includes, in various embodiments one or more mechanisms for adjusting its size. For example, the mannequin 102 may include movable portions that form a part of or are attached to the mannequin's exterior surface 104. The mechanisms for controlling movements of the movable portions of the exterior surface 104 include, in various embodiments, one or more of electric motors, hydraulic components, magnetic components, inflatable components, and so forth. In one specific example, one or more electric motors mounted within an interior of the mannequin 102 adjust screws affixed to the movable portions that cause the mannequin 102 to expand or contract in various dimensions.

In the example illustrated in FIG. 1, the mannequin 102 includes movable portions that enable the mannequin 102 to be adjusted in three size attributes: a chest size A, a waist size B, and a hip size C. In other embodiments of the mannequin 102, the mannequin 102 is adjustable in more, fewer, or different size attributes such as a shoulder size, a bust size, a neck size (e.g., length or circumference), an arm size (e.g., length or circumference), a thigh size (e.g., length or circumference), a calf size (e.g., length or circumference), a torso size (e.g., length), a foot size (e.g., width, length, circumference at various locations, toe length), and/or a hand size (e.g., width, length, circumference at various locations, finger length). Other examples are possible without departing from the scope of this disclosure.

The mannequin 102 is situated on a base 106, which may be controllably rotated as indicated by the arrow in FIG. 1. The base 106 may therefore include a mechanism, such as an electric motor, to enable the mannequin 102 to rotate. The mannequin 102 may also include mechanisms to enable the mannequin 102 be tilted, raised, or lowered depending on the application. A control server 108 is communicatively coupled to the mannequin 102. The control server 108 is shown in FIG. 1 as a separate component for the sake of illustration; in embodiments the control server 108 may be housed physically within the mannequin 102, such as within the base 106 or other location. The control server 108 is communicatively coupled to an image capture device 110, a lamp 112, and a database 114. In various embodiments, various ones of the components 102-114 may be housed together within a single unit; these components are shown as separate units for the sake of illustration only.

The mannequin 102 includes a plurality of sensors 116 disposed on the exterior surface 104. The mannequin 102 illustrated in FIG. 1 includes sensors 116 in three areas: disposed circumferentially around the chest area, disposed circumferentially around the waist area, and disposed circumferentially around the hip area. In other embodiments, the mannequin 102 includes more or fewer sensors 116. The sensors 116 may be disposed on large patches of the exterior surface 104, such that they collectively form a "skin" of the robotic mannequin 102. In other embodiments, there are only a small number of sensors 116 in a few select locations on the exterior surface 104. In one specific example, there may be one sensor in the chest area, one sensor in the waist area, and one sensor in the hip area. The sensors 116 may provide coverage of the exterior surface 104 at varying degrees of coarseness or fineness, and different levels of coverage may be provided at different areas of the mannequin 102, such as more coverage on a torso area and less (or no) coverage on leg and arm areas (such as on mannequins that have legs and arms). Other embodiments are possible without departing from the scope of embodiments.

In some embodiments, the sensors 116 are thin, round, curved materials that change their insulative/conductive properties when compressed. The sensors 116 are thus responsive to pressures applied to the exterior surface 104 of the mannequin 102. The sensors 116 may include a deformable substance that undergoes a change in an electrical resistance depending on a pressure applied to the sensor (e.g., the pressure applied causes the sensor to deform, which changes its resistance). An electrical resistance is measured based on, for example, detecting a current level produced by the sensor given a certain voltage level, using various means.

Other examples of the sensors 116 are used in other embodiments. For example, the sensors 116, according to some embodiments, include strain gauges that also react to increased pressures by changing resistance to electric current. In still other embodiments, electric motors used to operate the movable portions of the mannequin 102 may double as sensors. For example, the amount of power used by the electric motors to move the movable portions is a function partly of the pressure that the motor encounters. Thus, as the electric motor resists against a garment placed on the mannequin 102, a measure of the power used by the electric motor (such as based on a level of electrical current generated during operation of the motor) may serve as data usable to determine the pressure.

Other sensors (different from sensors 116) may be used to determine how much the robotic mannequin has expanded or contracted, and this information may be feedback into the control server 108 for use in controlling the mannequin 102.

The control server 108 performs one or more garment documentation procedures. In an automated photography procedure, the control server 108 controls the mannequin 102 to adjust its movable portions to cause the mannequin 102 to assume a plurality of size combinations. For example, the control server 108 may cause the mannequin 102 to assume a first size combination then progressively move through a series of size combinations, adjusting each of the size attributes (e.g., hip size, waist size, shoulder size, etc.) individually. Each progressive size combination differs from the previous one in at least one size attribute. Within limits, such as based on a maximum size that a particular garment can withstand without deforming or breaking, the robotic mannequin is therefore progressively controlled to assume all or some of the possible size combinations while a single garment remains placed on the robotic mannequin.

During the automated photography procedure, the control server 108 causes the image capture device 110 to capture one or more images of the mannequin 102 (as well as the garment place on the mannequin 102), such as from various angles, positions, and viewpoints. Thus, the control server 108 causes, in some embodiments, the mannequin 102 to rotate through various positions for each of a plurality of size combinations and to cause the image capture device 110 to capture images of the mannequin 102 at each rotational position. In the same or different embodiments, the image capture device 110 is moveable (e.g., it may be situated on a track, robotic arm, or other mechanism) and is configured to be controllably moved by the control server 108 about the space in order to capture images of the garment from the various angles. In another embodiment, the garment documentation system 100 includes multiple image capture devices located throughout the environment, at various points for capturing different views of the mannequin 102. In one specific example, the control server 108 causes the image capture device 110 to capture images of the garment from positions that are offset from one another by 45-degrees, such as throughout 360-degrees. Also, images of the garment at various angles may also be captured at various vertical positions and angles, so that for example lower, straight-ahead, and above images of the garment are captured at the various rotation angles of the mannequin 102. Other examples are possible without departing from the scope of embodiments.

The control server 108 also, in some embodiments, causes the lamp 112 to flash or otherwise adjust its brightness during the automated photography procedure.

The control server 108 is, in some embodiments, configured to perform a garment property determination procedure either during or separate from an automated photography procedure. As the mannequin 102 progresses through a plurality of size attribute combinations, the control server 108 receives signals indicative of the pressure exerted by the garment on the exterior surface 104 of the mannequin 102. For example, the control server 108 may receive pressure readings signals, electrical current signals, electrical resistance signals, electrical voltage signals, unitless signals, or other signals from the mannequin 102. The control server 108 determines from these signals, such as by conversion of the signals to pressure readings applied by the garment to different locations on the exterior surface 104 of the mannequin 102, various dimensions of the garment. This determination may be based at least in part on detecting a threshold pressure reading, threshold current, resistance, voltage, or unitless signal. The threshold signals may indicate those one or more size attributes that cause the garment to be pulled against the exterior surface 104 of the mannequin 102 in one or more dimensions (e.g., the hip, chest, shoulder, etc.).

The garment dimensions and/or estimated body size fit for the garment may be determined from this data. The garment dimensions and/or estimated body size fit (which are not necessarily the same thing) may be based on the size attribute(s) that initially cause the garment to apply pressure to the mannequin 102. Depending on the usual way in which a particular garment or its fabric is worn (or estimated to be worn), the estimated body size fit may be smaller or larger than the actual garment dimensions. Identification of an actual garment size using pressure readings from the exterior surface 104 of the mannequin 102 facilitates the identification of estimated body size fit. For example, some garments are intended to be worn, or are usually worn, tightly. Thus a more snug (larger body size) fit is determined for those garments. In another example, some garments are intended to be worn, or are usually worn, more loosely. For those garments, a less snug (smaller body size) fit is determined. Other examples are possible without departing from the scope of embodiments.

The garment properties determination procedure also, in some embodiments, includes a determination of the elasticity of the garment. This may be based on a detected change in pressure associated with incremental adjustments of the movable portions of the mannequin 102. The change in pressure over a given change in expansion or contraction length of the mannequin 102 provides a measure of the garment's elasticity. The garment dimensions and/or estimated body size fit determination may also take elasticity into consideration. For example, a relatively tighter fit may be determined for garments having a relatively higher elasticity, and relatively looser fits may be determined for garments having a relatively lower elasticity, although some relatively inelastic garments may be intended to be worn tightly (such as some jeans).

The control server 108 also, in some embodiments, utilizes pressure readings to determine that the size of the mannequin, in or more attributes, has reached a size limit of the garment. In some embodiments, the control server 108 prevents the mannequin 102 from assuming attribute sizes greater than corresponding size limits of the garment, so as to avoid breaking the garment or deforming the garment through stretching.

In embodiments, the control server 108 extrapolates a garment dimensions and/or estimated body fit for one garment from the determined garment dimensions or estimated body fits for other garments. For example, garments typically come in more than one size. For example, a dress may come in sizes 2, 4, 6, 8, 10, and 12, as well as other sizes. In this example, the control server 108 may determine dimensions for size 2, size 4, and size 6 versions of the garment based on pressure sensor data. Based on these dimensions, the garment dimensions and/or body fit for the size 8, 10, and 12 versions of the garment may be determined by the control server 108 or other device based on an assumption that the garment attribute sizes increase proportionally. For example, where sizes 2, 4, and 6 each differ in the waist by 2 centimeters, it may be assumed that further garment size increases also increase waist size by 2 centimeters with each step up in garment sizing. In the same or different embodiments, a determined correlation may be identified based on a linear or non-linear relationship between the sizes of the garments and their measured dimensions. Also, such data may be used to estimate sizes of different items of clothing from the same manufacturer. For example, a large data set of clothing sizes from a single manufacturer may show a reliable correlation between garment sizing and actual dimensions or body fit for that manufacturer. Thus, garment dimensions for garments that have not been directly measured may be estimated based on other garments from the same manufacturer that have been directly measured. In some embodiments, these estimated garment dimensions may be used temporarily, until such garments are measured.

In some embodiments, where garment dimensions and/or body fit are extrapolated or estimated from other sizes of the same garment, photographs of smaller-sized garments are used in place of photographs of larger-sized garments. For example, the control server 108 (or other device) may determine from the estimated or extrapolated garment sizes that a photograph of a size 4 dress on the robotic mannequin 102 while the robotic mannequin 102 assumes a first size combination fits the same as or similar to a size 6 dress on a body size that is a second size combination. Thus, a photograph of the size 4 dress on a mannequin that is assuming the first attribute size combination may be used in place of a photograph of an actual size 6 dress on a mannequin that is assuming the second attribute size combination.

The control server 108 causes various data collected during the garment documentation procedures to be stored in the database 114. For example, various sensor data (including raw sensor data) may be stored in the database 114 and correlated with the corresponding size attributes assumed by the mannequin 102 when the sensor data is captured. Additionally, images of the mannequin 102 with garments placed thereon are stored in the database 114 and correlated with the corresponding size attributes of the mannequin 102. Also, the garment properties such as size, dimensions, elasticity, and/or estimated body size fit are also stored in the database 114. And one or more photographs that correspond to the garment dimensions and/or estimated body size fit are also identified within the database 114, so that they may be used for various purposes, such as model photographs for the garment. In embodiments, more than one database may be used to store one or more items discussed above.

Figure 2:
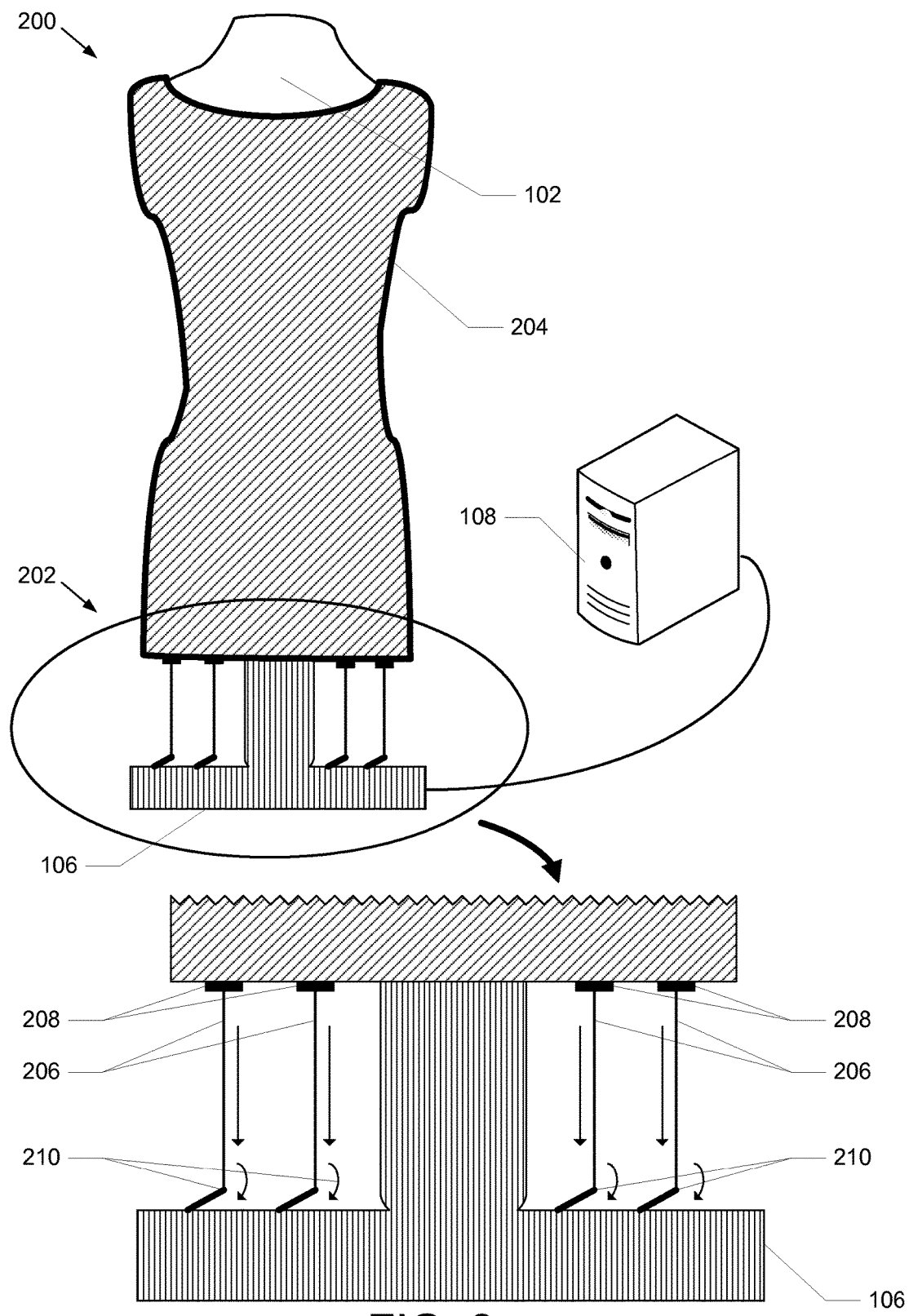
FIG. 2 illustrates a garment documentation system having a fit adjustment mechanism.

The garment properties documentation procedures may also utilize a fit adjustment mechanism, which is described with respect to FIG. 2.

FIG. 2 illustrates a garment documentation system 200 having a fit adjustment mechanism 202. The garment documentation system 200 may be the same as or different form the garment documentation system 100. As illustrated in FIG. 2, a garment 204 is placed on the mannequin 102. The fit adjustment mechanism 202 includes a plurality of connectors 206, which may be selected to be thin so as to be invisible or barely visible in a photograph, and which may include wires, string, line, rods, dowels or other connectors. The connectors 206 are attached to the garment 204 using a plurality of attachment members 208, which may be alligator clips, adhesive tape, putty, safety pins or other attachment members 208, selected so as to prevent staining, breaking, tearing, pulling, and/or permanently adhering to the garment 204. The connectors 206 are attached in some embodiments to an inside portion of the garment 204 to avoid being visible in photographs of the garment 204.

The connectors 206 are attached to a plurality of levers 210 or other mechanisms, which are controllable to pull the connectors 206 downward, thereby tugging gently on the garment 204. Other embodiments of the fit adjustment mechanism 202 may pull on other portions of the garment 204 besides the bottom of the garment 204, such as on the collar, sleeve, shoulder, thigh, waist, or other portions. Other embodiments of the fit adjustment mechanism 202 may include rigid or semi-rigid connectors 206 that enable the garment to be pushed, rather than tugged or pulled, in one or more locations. In still other embodiments, the fit adjustment mechanism 202 includes a combination of pull and push adjustments, and includes attachments in a plurality of locations of the garment, such as for example on both the sleeves and the bottom hem of a dress. In embodiments, the pushing or tugging of the garment 204 may be from a direction other than below the garment, such as from above the garment, from the side of the garment, from within the mannequin 102, and so forth.

The control server 108 may determine that a fit of the garment 204 is deficient—such as based on pressure sensor readings from the mannequin 102—and activate the fit adjustment mechanism 202 responsive to this determination.

Portions of the fit adjustment mechanism 202 may be selectively activated to adjust the fit differently under different circumstances. For example, the control server 108 may cause tugging on the bottom portion of the garment 204 at the rear of the garment 204 before photographs of the rear of the garment 204 are taken, and tugging on the front bottom portion of the garment 204 before photographs of the front of the garment 204 are taken. Specific adjustments for some or all photograph angles may be utilized. In another example, sensor readings may indicate that the fit of the garment 204 is deficient in that it has ridden up the right shoulder of the mannequin 102, thus the control sever 108 may selectively cause the fit adjustment mechanism 202 to tug downward on the bottom hem of the garment 204 on the right side only.

Figure 3:
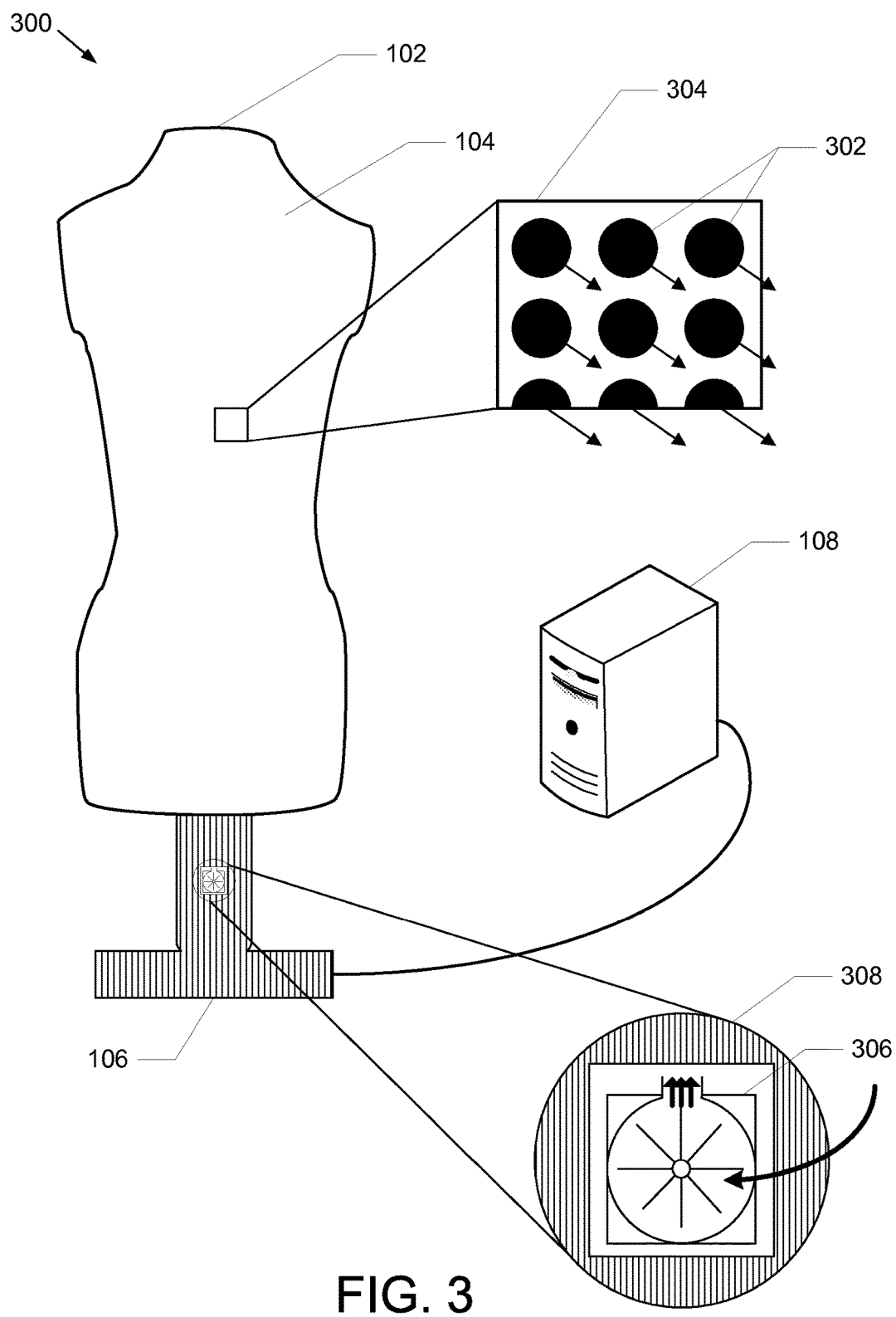
FIG. 3 illustrates a garment documentation system having a pneumatic fit adjustment mechanism.

In other embodiments, image processing is utilized to identify fit or aesthetic style issues with the garment, such as pleats, creases, wrinkles, shadows, etc. In one example, pleats or horizontal folds in the clothing are detected with image-processing algorithms such as edge detection and Hough line transforms. The control server 108 uses this information to determine whether to activate, or selectively activate, the adjustment mechanism 202 (or other fit adjustment mechanism such as is illustrated in FIG. 3) to adjust the fit of the garment 204. In various embodiments, "fit-check" photographs are taken to highlight pleats and folds by photographing a garment while a frontwards facing camera light is turned off and while side-on or from-above lights are turned on. These "fit check" photographs help identify pleats and creases, thereby making identification of the fit issue more reliable.

Other examples of fit deficiency determination are possible without departing from the scope of embodiments. Where fit adjustment is determined to fail, such as based on pressure sensor readings captured after fit adjustment, an alert of some kind (e.g., a visual alert, an audible alert, and so forth) may be issued for an attendant to adjust the garment. The garment documentation process may be halted where fit adjustment fails until an attendant selects to continue garment documentation.

Fit adjustment may also be utilized during the garment property determination procedures. The control server 108 is configured to determine from sensor signals that a pressure reading from the garment 204 is unexpected. For example, as the size of the mannequin 102 increases, it is expected that the pressure readings will either increase or stay the same. But a decrease in the pressure readings may indicate that the garment 204 has shifted on the mannequin 102; for example, the garment 204 may have ridden up the garment as the hip size of the mannequin 102 is increased. Based on this determination, the control server 108 may cause the fit adjustment mechanism 202 to adjust the fit of the garment 204, discard the unexpected pressure readings, and take new pressure readings from the garment 204 for the current size combination of the mannequin.

Various aspects of the fit adjustment mechanism 202 or other fit adjustment mechanism may be visible in photographs taken of the garment 204. For example, some or all of the connectors 206, attachment members 208, and the levers 210 may be visible. In various embodiments, visible aspects of the fit adjustment mechanism 202 are removed in a post-processing stage either manually or via automated algorithms. For example, a mechanism-removal algorithm may detect a specific color (such as chroma key green or other color) and remove all aspects of the photograph that match that color, replacing them with color from surrounding or background areas of the photograph. In a similar fashion, in various embodiments, unwanted creases, pleats, or folds may be minimized or removed from photographs in post-processing stages.

Other fit adjustment mechanisms different from those described with respect to FIG. 2 are used in some embodiments. For example, a pneumatic fit adjustment system as illustrated in FIG. 3 is used in some embodiments.

FIG. 3 illustrates a garment documentation system 300 having a pneumatic fit adjustment mechanism. The exterior surface 104 of the mannequin 102 includes a plurality of air holes 302 (illustrated in the expanded portion 304 of FIG. 3). A fan or blower mechanism is employed to cause air to enter the mannequin 102 and exit the air holes 302. For example, as illustrated in FIG. 3, a blower 306 is situated within the base 106, as is shown in the blown-up, cut-away portion 308. The blower 306 illustrated in FIG. 3 is a centrifugal fan that draws air in through an air intake port on the base 106 and causes the air to blow upwards into the mannequin 102. Other types of fans or blowers, as well as additional numbers of fans or blowers (and of various types) may be used. In other embodiments, one or more air channels are disposed within the mannequin 102 to direct air from the blower 306 to one or more sections of the interior of the mannequin 102.

The air holes 302 and/or various fans (such as the blower 306) are, in some embodiments, selectively activated to cause different fit adjustments. For example, moveable barriers may be controllably moved to close or open different ones of the air holes 302, and one or more fans (which are pneumatically connected to different ones of the air holes 302 located on different portions of the mannequin 102) may be controllable turned on to cause different fit adjustments of a garment placed onto the mannequin 102. In other embodiments, a partial set of a plurality of fans may be activated to cause air to flow out some but not all of the air holes 302. In other embodiments, fan speeds may be set to cause different air pressures. Selective activation is based on, for example, an angle being employed to capture an image of the garment, a detected fit deficiency, a special effect desired for a particular image (such as a billowing of a bottom of a dress on the mannequin), and so forth.

Figure 4:
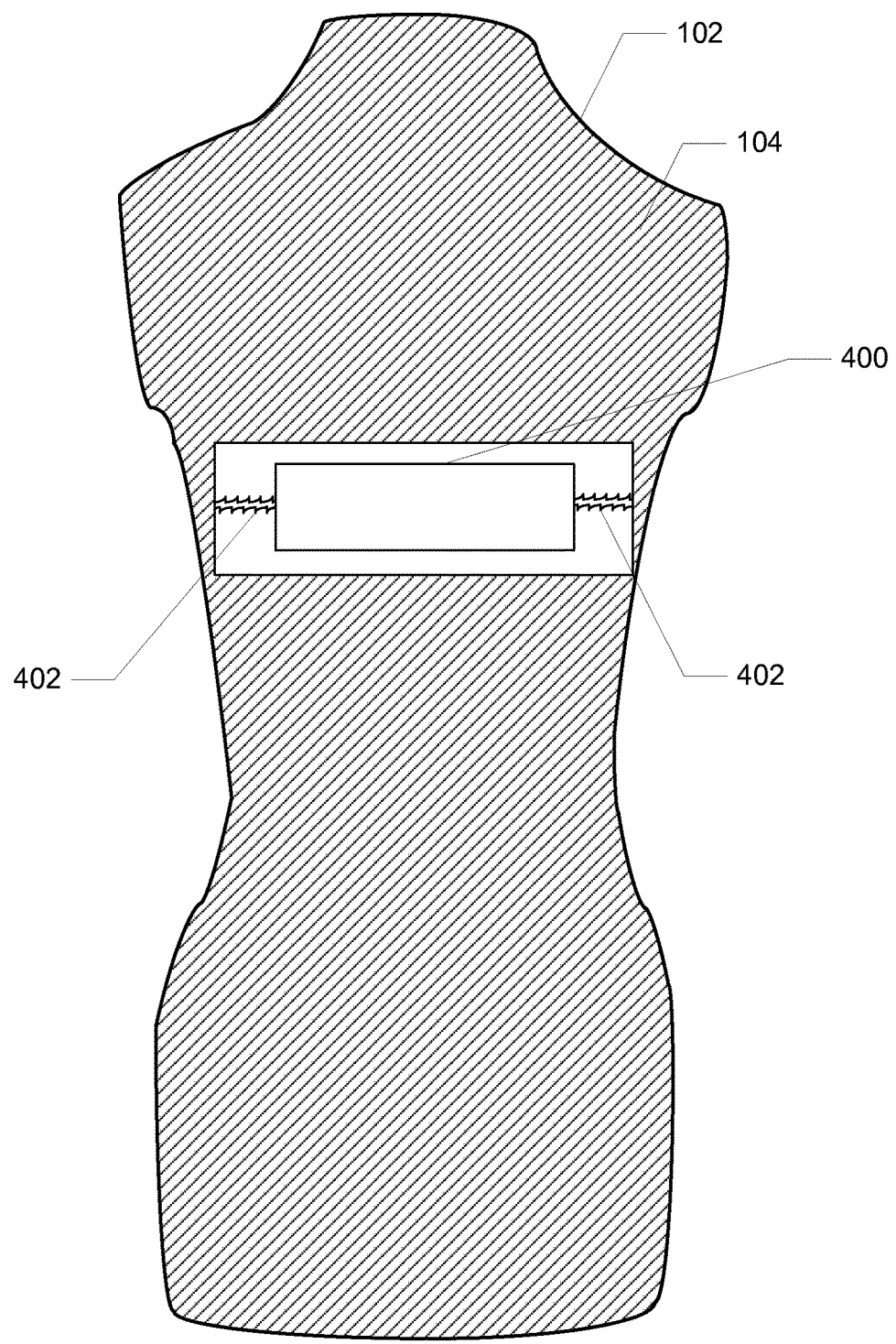
FIG. 4 illustrates a cut-away view of a mannequin showing a mechanism for controlling the size of the mannequin.

FIG. 4 illustrates a cut-away view of a mannequin 102 showing a mechanism for controlling the size of the mannequin 102. As discussed above, the mannequin 102 includes one more adjustable portions that are controllable, through various mechanisms, to assume different sizes in various dimensions. In one embodiment, electric motors, such as an electric motor 400, are disposed within an interior of the mannequin 102. The electric motor 400 controls one or more screws 402, which are attached to the movable portions that form a portion of the exterior surface 104 of the mannequin 102. The electric motor 400 causes the screws 402 to turn either clockwise or counter-clockwise, depending on whether the attribute size is to be reduced or expanded. In the example shown in FIG. 4, the electric motor 400 adjusts the screws 402 in order to increase or decrease a chest size of the mannequin 102. In embodiments, the additional mechanisms, including additional electric motors and additional screws, may adjust other moveable portions of the mannequin 102. A single electric motor 400 is shown in FIG. 4 for the sake of illustration only, and other examples are possible without departing from the scope of embodiments.

Example Computing System

Figure 5:
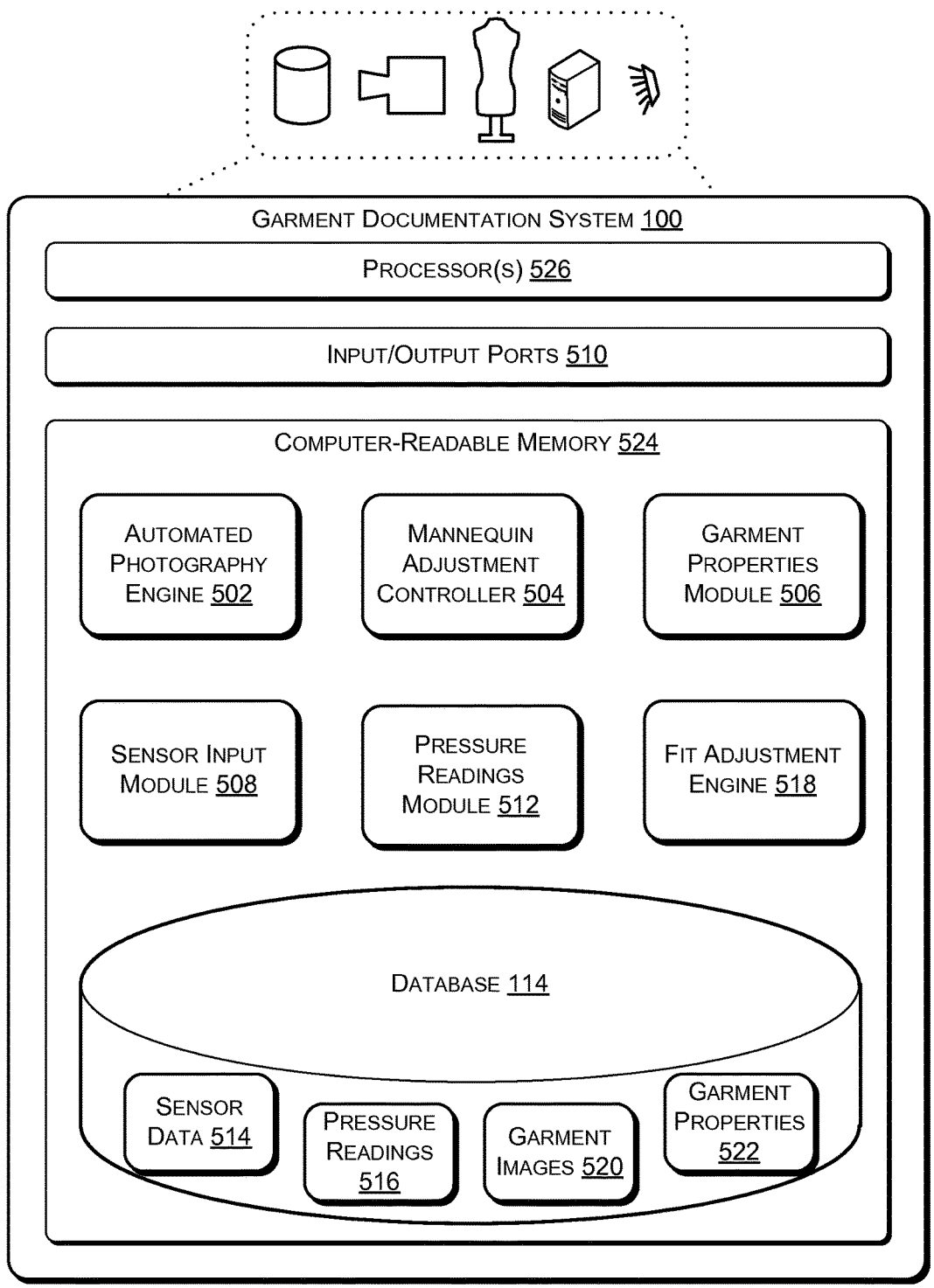
FIG. 5 illustrates an example computing system suitable to implement a garment documentation system.

FIG. 5 illustrates an example computing system suitable to implement a garment documentation system 100. An automated photography engine 502 is configured to perform an automated photography procedure, such as is described elsewhere within this Detailed Description. The automated photography engine 502 may cause a mannequin adjustment controller 504 to adjust a size of a robotic mannequin, such as the mannequin 102, in one or more attributes or dimensions, in order to assume a particular size combination. The automated photography engine 502 also controls operation of one or more image capture devices, such as the image capture device 110 and one or more lamps, such as the lamp 112, to capture one or more images of the robotic mannequin, such as images of the robotic mannequin with a garment placed thereon.

A garment properties module 506 is configured to perform a garment properties determination procedure, such as is described in more detail elsewhere within this Detailed Description. The garment properties module 506 may cause the mannequin adjustment controller 504 to adjust a size of a robotic mannequin in one or more attributes or dimensions, in order to assume a particular size combination. The garment properties module 506 is configure to determine, from pressure readings of sensors located on an exterior surface of the robotic mannequin, garment sizes and/or garment elasticity.

A sensor input module 508 is configured to receive, via one or more input/output ports 510, sensor signals from the plurality of pressure sensors on the exterior surface of the robotic mannequin. The sensor signals may indicate a current, a resistance, a voltage, an actual pressure reading, a unitless measure, or other information that can be converted to a pressure reading from the one or more pressure signals. In embodiments, the sensor input module 508 may include a hardware component that directly receives electric current from the sensors, calculates a resistance, and provides the resistance to a software component of the sensor input module 508. A raw, analog current signal may be digitized by a hardware component and provided to the software component the sensor input module 508. The hardware component may be located physically within the robotic mannequin while in other embodiments, the hardware component may be located within a separate component, such as a control server. Other examples are possible without departing from the scope of embodiments.

A pressure readings module 512 is configured to receive sensor data 514 from the sensor input module 508 and convert them to pressure readings 516. The sensor data 514 and/or the pressure readings 516 are correlated in the database 114 with associated mannequin size combinations (e.g., the mannequin size combinations that resulted in the sensor data 514 and/or the pressure readings 516).

The mannequin adjustment controller 504 is configured, in various embodiments, to cause the robotic mannequin to progressively assume a plurality of size combinations, such as in association with the automated photography engine 502 or in association with the garment properties module 506. The mannequin adjustment controller 504 controls the robotic mannequin through the one or more input/output ports 510.

A fit adjustment engine 518 is configured to control a fit adjustment mechanism to adjust a fit or placement of a garment on the robotic mannequin, such as during an automated photography procedure and/or a garment properties determination procedure.

The automated photography engine 502 is configured to store captured garment images 520, which are correlated within the database 114 with associated mannequin size combinations. The garment properties module 506 is configured to store determined garment properties 522. In embodiments, the automated photography engine 502 and/or the garment properties module 506 are configured to identify and flag in the database 114, particular ones of the garment images 520 that are captured while the robotic mannequin assumes a garment or estimated body fit size for a particular garment. In embodiments, the data stored in the database 114 is correlated with particular garment identifiers (such as garment brand, style, color, fabric, reported size (e.g., size reported by the manufacturer, such as a letter or number size), and so forth).

Computer-Readable Memory

In embodiments, computer-readable memory 524 may include volatile memory (such as Random Access memory (RAM)), nonvolatile memory, removable memory, and/or non-removable memory, implemented in any method or technology for storage of information, such as computer-readable instructions, data structures, program modules, or other data. Also, the processor(s) 526 may include onboard memory in addition to or instead of the computer-readable memory 524. Some examples of storage media that may be included in the computer-readable memory 524 and/or processor(s) 526 include, but are not limited to, RAM, read only memory (ROM), electrically erasable programmable read only memory (EEPROM), flash memory or other memory technology, compact disk (CD-ROM), digital versatile disks (DVD) or other optical storage, magnetic cassettes, magnetic tape, magnetic disk storage or other magnetic storage devices, or any other medium usable to store the desired information and that can be accessed by the garment documentation system 100. Any such computer-readable media may be part of the garment documentation system 100. Computer-readable memory includes storage media, but does not include communication media such as carrier waves, modulated signals, or other transmission mechanisms.

The computer-readable memory 524, meanwhile, may include software programs or other executable modules that may be executed by the processor(s) 526. Examples of such programs or modules include control modules (e.g., power management), network connection software, an operating system, sensor algorithms, and so forth. The computer-readable memory 524 may also be used to store various databases, such as the database 114.

Various processes, instructions, methods and techniques described herein may be considered in the general context of computer-executable instructions, such as one or more program modules, that are executable by one or more computers or other devices. Generally, program modules include routines, programs, objects, components, data structures, etc., for performing particular tasks or implementing particular abstract data types. These program modules can be implemented as software modules that are executable on the processor(s) 526, as hardware, and/or as firmware. Typically, the functionality of the program modules may be combined or distributed as desired in various embodiments. An implementation of these modules and techniques may be stored on or transmitted across some form of computer-readable media.

The modules stored in computer-readable memory 524 may be implemented across one or more servers in a cloud computing environment, on a local device, or on a combination of both. The following discussion does not limit the implementation of the modules stored in computer-readable memory 524 to any particular device or environment.

Example Operations

Figure 6:
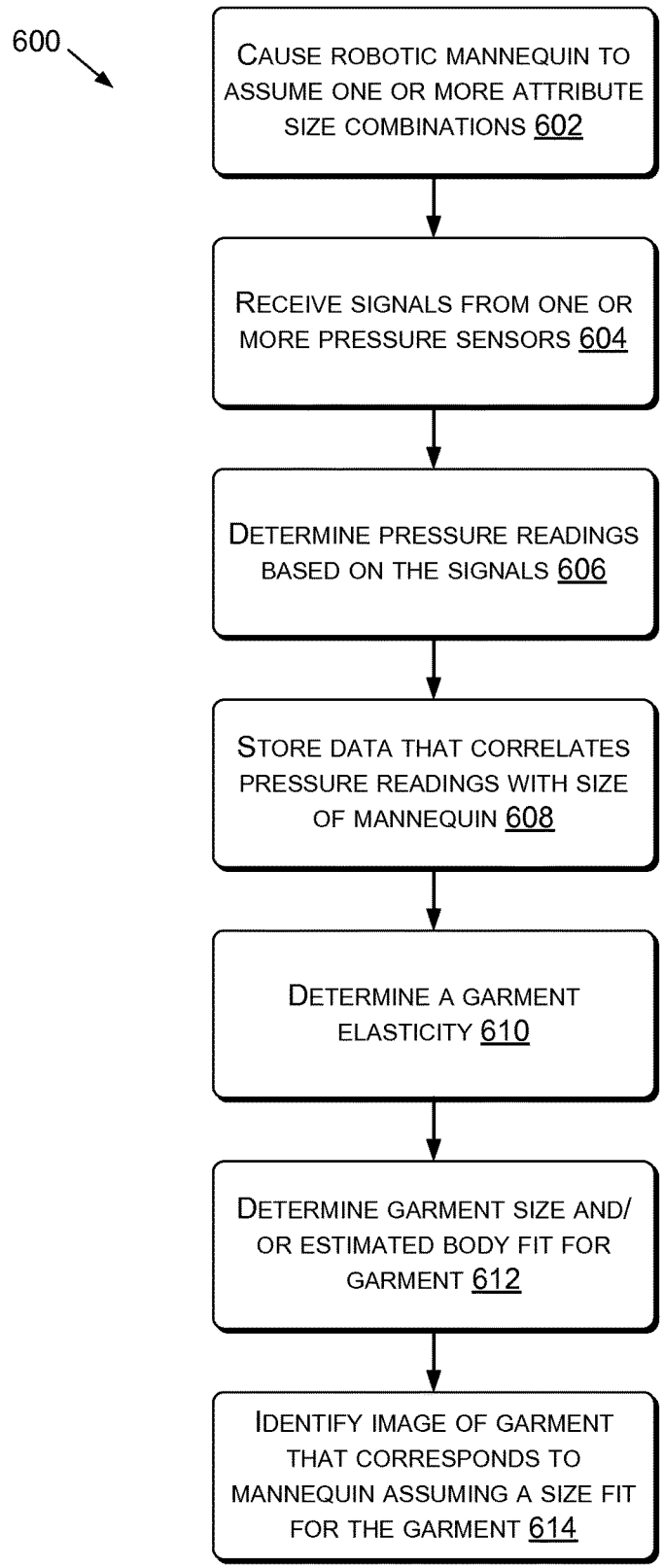
FIG. 6 shows an illustrative operation for providing a garment properties determination procedure.

FIG. 6 shows an illustrative operation 600 for providing a garment properties determination procedure. At 602, a garment documentation system causes a robotic mannequin to adjust a plurality of movable portions to assume one or more attribute size combinations. The garment documentation system, in some embodiments, causes the robotic mannequin to progressively adjust the movable portions to progress through a plurality of attribute size combinations, such as from a first size to a second size to a third size, and so forth, until the robotic mannequin has progressed through the plurality of attribute size combinations. In some embodiments of the robotic mannequin, adjustment of at least a first movable portion adjusts a first attribute size of the mannequin and adjusting at least a second movable portion adjusts a second attribute size of the mannequin.

At 604, signals from a plurality of sensors of the robotic mannequin are received. The signals correspond to pressures applied to a plurality of locations on the exterior surface of the robotic mannequin, such as applied by a garment placed onto the mannequin's exterior surface. The plurality of locations, in some embodiments, corresponds to areas of the robotic mannequin that are adjustable to change an attribute size of the robotic mannequin. For example, a chest size of the robotic mannequin may be adjustable and there may be sensors placed on the exterior surface of the robotic mannequin to detect a pressure applied in the chest area.

In embodiments, the signals may be raw signals, and thus may be an electric current, a voltage, or any other signal such as an electrical, optical, or audible signal. In some embodiments, the signals may be digitized signals, amplified signals, converted signals, actual pressure readings, and so forth. Embodiments are not limited by the type or types of signals received.

At 606, corresponding pressure readings applied to one or more locations of the exterior surface are determined. The pressure readings are determined from the received sensor signals. Pressure readings for the one or more locations of the exterior surface are determined for multiple ones of the attribute size combinations assumed by the robotic mannequin during the operation 600.

At 608, the garment documentation system stores data that correlates individual pressure readings with a size of the mannequin (e.g., the attribute size combination) that resulted in the pressure readings. For example, data correlating a first pressure reading with a first size of the mannequin, and a second pressure reading with the second size of the mannequin, and so forth, are stored. Also, multiple pressure readings are correlated, in various embodiments, with the same attribute size combination. In one example, a particular attribute size combination is correlated with data indicating a hip area pressure reading, a chest area pressure reading, and a waist area pressure reading.

At 610, the garment documentation system determines, based at least on a subset of the plurality of pressure readings, an elasticity of the garment placed onto the mannequin. The elasticity of the garment is determined based on a change in pressure resulting from a given increase or decrease in distance, such as an increase or decrease in distance associated with the robotic mannequin changing a particular attribute (e.g., hip, waist, chest, shoulder, etc.) from a first size to a second size. For example, the change in size may be a 0.5 inch, a 2 mm change, or other distance change. The elasticity may be estimated or calculated from more than two pressure readings, such as from three or more pressure readings taken at three or more sizes of the mannequin.

At 612, the garment documentation system determines a size of the garment, and/or an estimated body fit for the garment, based at least on the pressure readings associated with a plurality of attribute size combinations. In embodiments, determination of the size and/or estimated body fit for the garment is based on the elasticity of the garment. In some embodiments, both a size of the garment as well as an estimated body fit for the garment are determined, which may not be the same. For example, a loosely worn piece of clothing may have an estimated body fit that is smaller than the actual dimensions of the garment. In some embodiments, the determined elasticity of the garment is used to determine the estimated body fit for the garment; in one example, a relatively elastic garment may be determined to have a different estimated body fit than a relatively inelastic garment having the same dimensions as the highly elastic garment.

In some embodiments, the garment documentation determines a size of the garment based at least on determining that one or more pressure readings, associated with a particular one of the plurality of attribute size combinations, meets or exceeds a pressure threshold in at least one location on the exterior surface of the robotic mannequin. In one example, identifying an attribute size combination of the robotic mannequin that causes pressure in the chest area, pressure in the waist area, and pressure in the thigh area to each reach or exceed the pressure threshold is used to identify the size of the garment and/or the estimated body fit for the garment. The size of the garment and/or the estimated body fit for the garment includes, in some embodiments, two or more dimensions, such as a chest measurement, a waist measurement, and a hip measurement (in one example).

At 614, the garment documentation system identifies, based on the stored data, a particular one of a plurality of photographs or images taken of the mannequin assuming a particular one of the plurality of attribute size combinations that corresponds to the size and/or estimated body fit of the garment. As described elsewhere within this Detailed Description, the garment properties determination procedure 600 may be performed along with, or in addition to, an automated photography procedure; a plurality of photographs of the mannequin are captured at one or more of the attribute size combinations of the mannequin, thus enabling the garment documentation system to correlate one or more photographs of the mannequin with a particular attribute size combination of the mannequin that corresponds to a garment size and/or estimated body fit for the garment. This may include identifying a photograph taken at a time during which the mannequin assumes or substantially assumes corresponding body size measurements determined or estimated to fit the garment. The identified photograph or image may be used as a model photograph for the garment, such as in a product detail page for the garment in an e-commerce website, in a printed catalog, or other medium.

Figure 7:
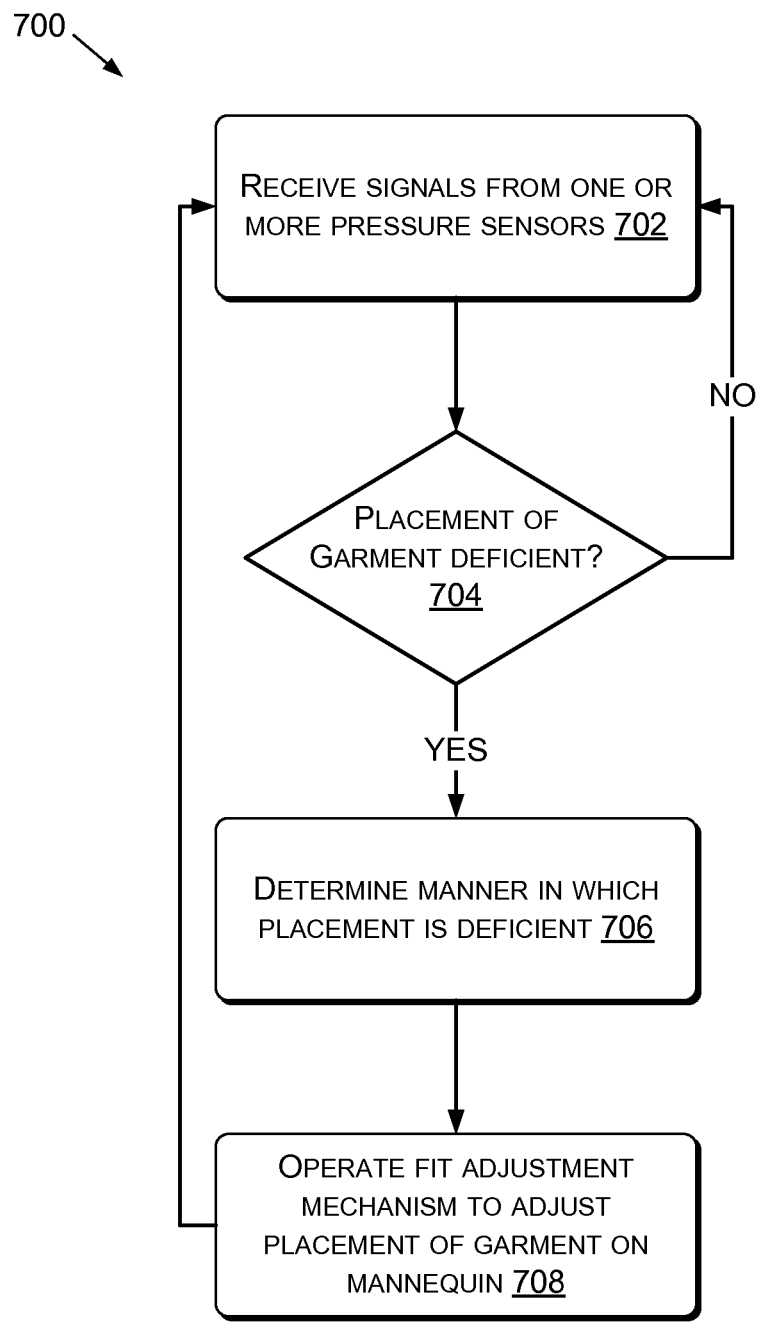
FIG. 7 shows an illustrative operation for providing a fit adjustment procedure.

FIG. 7 shows an illustrative operation 700 for providing a fit adjustment procedure. The fit adjustment procedure described in FIG. 7 is performed, in various embodiments, along with a garment properties determination procedure and/or along with an automated photography process. At 702, a garment documentation system receives signals from a plurality of sensors of a robotic mannequin. The signals correspond to pressures applied to a plurality of locations of the exterior surface of the robotic mannequin, such as by a garment placed onto the mannequin's exterior surface. The plurality of locations, in some embodiments, corresponds to areas of the robotic mannequin that are adjustable to change an attribute size of the robotic mannequin. For example, a chest size of the robotic mannequin may be adjustable and there may be sensors placed on the exterior surface of the robotic mannequin to detect a pressure applied in the chest area.

At 704, a garment documentation system determines from the signals that a placement of a garment on the mannequin is deficient. Determining that a placement is deficient is based on pressure readings that are unexpected or incongruent with a current size attribute combination assumed by the robotic mannequin. For example, as the robotic mannequin expands in size, it is expected that the pressure readings from various locations on the exterior surface of the mannequin will stay the same or increase; a garment will not become looser as the mannequin expands in size. A decrease in a pressure reading in one or more areas that corresponds to an increase in the mannequin's size may indicate that the garment has shifted on the mannequin and is thus not properly placed on the mannequin. In one example, the increasing size of the mannequin may cause a dress to ride up the hips of the mannequin, thereby indicating that the placement of the garment on the mannequin is deficient.

At 706, following the "YES" arrow, in some embodiments the garment documentation system determines, from the signals and/or pressure readings, a manner in which the placement of the garment is deficient. Pressure readings may indicate, for example, that the garment has ridden up the hips, rotated about the mannequin, ridden up the shoulders, bunched up in the sleeve, and so forth. The manner of placement deficiency is determined, in various embodiments, based on differences in pressure readings between similar spots on the robotic mannequin (such as differences in pressure readings on the right and left shoulders, right and left chest areas, or other locations) and/or unexpected pressure readings (such as decreased pressure readings on the hips corresponding to an increase in the hip size of the mannequin), or based on other pressure readings. Other examples are possible without departing from the scope of embodiments.

At 708, the garment documentation system causes, responsive to the determining that the placement is deficient, an adjustment mechanism to adjust the placement of the garment on the mannequin. In embodiments, the fit adjustment mechanism includes one or more of wires, rods, dowels, or other attachments, pneumatic air holes in an exterior surface of the garment, fans, blowers, etc. Once the fit adjustment is performed, the automated photography process and/or the garment properties determination process may be resumed.

In embodiments of the garment documentation system that determine a particular manner in which the placement is deficient, portions of the fit adjustment mechanism may be selectively activated by the garment documentation system based on the manner in which the placement of the garment is deficient. In one example, a determination that the garment rides up the hips causes activation of a first adjustment mode, and determination that the garment has shifted off of the shoulders causes activation of a second adjustment mode. Other examples are possible without departing from the scope of the present disclosure.

In alternative embodiments, a selective fit adjustment may be performed depending on a stage of the garment documentation process. For example, a first fit adjustment may be performed prior to photographing a back of a garment and a second fit adjustment may be performed prior to photographing a front of the garment. In these and other embodiments, fit adjustment may be performed periodically without first determining that the placement of the garment is deficient. For example, fit adjustment may be performed after each Nth progressive mannequin attribute size change, such as after every change (N=1), every second change (N=2), every third change (N=3), and so forth. In some embodiments, the fit adjustment is performed after each Nth change of a particular one of the attribute size changes, such as after every change of a hip size, but not necessarily after every change of a waist size, and so forth. A first adjustment mode may be activated upon every Nth shoulder size change, and a second adjustment mode may be activated upon every Mth hip size change (where M≠N). Other examples are possible without departing from the scope of the present disclosure.

Figure 8:
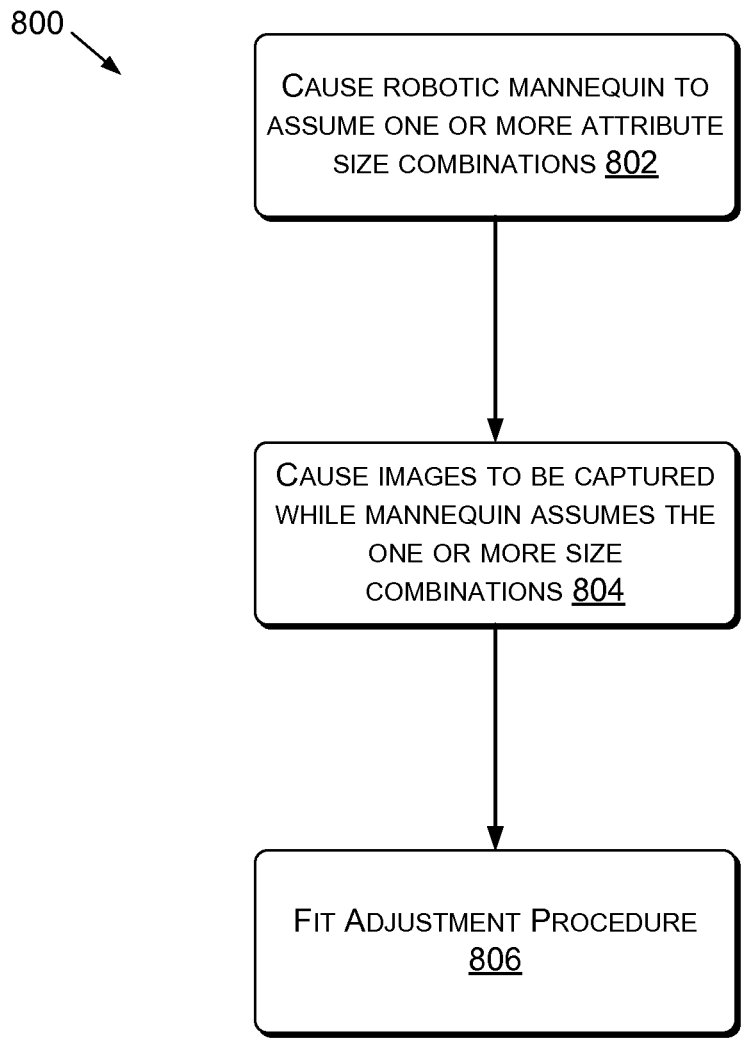
FIG. 8 shows an illustrative operation for providing an automated photography procedure.

FIG. 8 shows an illustrative operation 800 for providing an automated photography procedure. At 802, a garment documentation system causes a robotic mannequin to adjust a plurality of movable portions to assume one or more attribute size combinations. The garment documentation system, in some embodiments, causes the robotic mannequin to progressively adjust the movable portions to progress through a plurality of attribute size combinations, such as from a first size to a second size to a third size, and so forth, until the robotic mannequin has progressed through the plurality of attribute size combinations. In some embodiments of the robotic mannequin, adjustment of at least a first movable portion adjusts a first attribute size of the mannequin and adjusting at least a second movable portion adjusts a second attribute size of the mannequin.

At 804, the garment documentation system causes an image capture device, such as a digital camera, to capture a plurality of photographs of the robotic mannequin for the ones of the plurality of attribute size combinations. For example, one or more photographs (such as photographs taken from different angles or viewpoints) may be taken of the robotic mannequin (and the garment placed thereon) at some or all of a plurality of attribute size combinations that the mannequin progresses through. For example, at least a first photograph of a garment placed on the mannequin is captured at a first time period that corresponds to the mannequin assuming a first size, and at least a second photograph of the garment is captured at a second time period that corresponds to the mannequin assuming a second size, and so forth, until one or more photographs of the garment and mannequin are captured for some or all of a plurality of attribute size combinations that the mannequin progresses through.

At 806, a fit adjustment procedure is performed. The fit adjustment procedure includes, in some embodiments, the operation 700 described with respect to FIG. 7. In the same or different embodiments, the fit adjustment procedure is performed upon every Nth change of one or more of the attribute size changes assumed by the robotic mannequin.

The aforementioned techniques include a set of illustrative techniques for garment documentation. However other techniques may be employed to accomplish similar results.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:

1. A garment documentation system comprising:
   one or more output ports;
   one or more input ports;
   one or more processors; and
   a memory that stores one or more computer-executable instructions that are executable by the one or more processors to cause the garment documentation system to:
   operate, via the one or more output ports, a robotic mannequin to progressively adjust a plurality of movable portions of the robotic mannequin to assume a plurality of attribute size combinations, the robotic mannequin configured to have a garment placed onto an exterior surface of the robotic mannequin;
   receive, via the one or more input ports, signals from a plurality of sensors of the robotic mannequin, the signals corresponding to pressures applied to a plurality of locations of the exterior surface of the robotic mannequin;
   determine from the signals, for individual attribute size combinations of the plurality of attribute size combinations, corresponding pressure readings applied to the plurality of locations of the exterior surface;
   determine a first image that depicts the robotic mannequin from a first angle and a second image that depicts the robotic mannequin from a second angle different than the first angle; and
   determine a size of the garment based at least on the corresponding pressure readings, the plurality of attribute size combinations, the first image, and the second image.

2. The garment documentation system of claim 1, wherein the one or more computer-executable instructions are further executable by the one or more processors to cause the garment documentation system to determine the size of the garment based at least on determining that a pressure reading of the plurality of pressure readings, associated with an attribute size combination of the plurality of attribute size combinations, meets or exceeds a pressure threshold in at least one location on the exterior surface of the robotic mannequin.

3. The garment documentation system of claim 1, wherein the one or more computer-executable instructions are further executable by the one or more processors to cause the garment documentation system to determine, based at least on a subset of the plurality of pressure readings, an elasticity of the garment placed onto the robotic mannequin.

4. The garment documentation system of claim 1, wherein the one or more computer-executable instructions are further executable by the one or more processors to cause the garment documentation system to:
cause a camera to capture a plurality of photographs of the robotic mannequin for the individual attribute size combinations; and
identify a photograph of the plurality of photographs that corresponds to an attribute size combination of the plurality of attribute size combinations that corresponds to the size of the garment.

5. A method comprising:
causing one or more movable portions of a mannequin to adjust, thereby causing the mannequin to change from a first size to a second size;
receiving, while a garment is on the mannequin, signals from one or more sensors of the mannequin;
determining, from the signals, pressure readings applied to at least one location on an exterior surface of the mannequin by the garment;
storing data that correlates at least a first pressure reading with the first size of the mannequin and that correlates at least a second pressure reading with the second size of the mannequin;
determining that the second pressure reading is less than the first pressure reading; and
adjusting, by an adjustment mechanism that is different from the mannequin, a position of the garment with respect to the mannequin based at least partly on the second pressure reading being less than the first pressure reading.

6. The method of claim 5, further comprising determining one or more dimensions of the garment based at least on the data.

7. The method of claim 5, further comprising determining, based at least on the data, one or more corresponding body size measurements that fit the garment.

8. The method of claim 7, further comprising:
taking a first photograph of the garment at a first time corresponding to the first size of the mannequin;
taking a second photograph of the garment at a second time corresponding to the second size of the mannequin; and
identifying, based at least on the data, at least one of the first photograph or the second photograph of the garment as being taken at one of the first time or the second time during which the mannequin assumes or substantially assumes the corresponding body size measurements that fit the garment.

9. The method of claim 5, further comprising determining, from at least the first pressure reading and the second pressure reading, an elasticity of the garment.

10. The method of claim 9, further comprising:
determining one or more dimensions of the garment based at least on the data; and
determining one or more corresponding body size measurements that fit the garment based at least on the elasticity of the garment and the one or more dimensions.

11. The method of claim 5, further comprising:
determining, from the signals, that a placement of the garment on the mannequin is deficient; and
causing, responsive to the determining that the placement is deficient, the adjustment mechanism to adjust the placement of the garment on the mannequin.

12. The method of claim 11, wherein:
the adjustment mechanism comprises one or more of wires attached to the garment; or
the garment is adjusted using one or more pneumatic air holes in the exterior surface of the garment.

13. The method of claim 11, further comprising determining, from the signals, a manner in which the placement of the garment is deficient, and wherein the causing the adjustment mechanism to adjust the placement includes selectively activating a mode of the adjustment mechanism based on the manner in which the placement of the garment is deficient.

14. The method of claim 5, wherein the causing the one or more movable portions of the mannequin to adjust includes causing adjustment of at least a first movable portion to adjust a first attribute size of the mannequin and adjusting at least a second movable portion to adjust a second attribute size of the mannequin, the first pressure reading and the second pressure reading both corresponding to the first attribute size of the mannequin, and the method further comprises:
storing data that correlates a third pressure reading with the first size and that correlates a fourth pressure reading with the second size, the third pressure reading and the fourth pressure reading corresponding to the second attribute size of the mannequin.

15. The method of claim 14, wherein the first attribute size and the second attribute size are different from one another, and at least the first attribute size includes one of a chest size of the mannequin, a hip size of the mannequin, a waist size of the mannequin, a shoulder size of the mannequin, a thigh size of the mannequin, a calf size of the mannequin, a neck size of the mannequin, or a bust size of the mannequin.

16. One or more non-transitory computer-readable storage media including a plurality of instructions executable by one or more processors of a computing system to:
cause a robotic mannequin to progressively assume a plurality of attribute size combinations that include a first attribute size combination and a second attribute size combination;
receive signals from a plurality of sensors of the robotic mannequin, the signals corresponding to pressures applied to a plurality of locations of an exterior surface of the robotic mannequin while a garment is placed on the robotic mannequin;
determine a first image of the robotic mannequin with the garment at a first time at which the robotic mannequin assumes the first attribute size combination and a second image of the robotic mannequin with the garment at a second time at which the robotic mannequin assumes the second attribute size combination, wherein the first image is captured at a first angle and the second image is captured at a second angle different from the first angle; and
select the first image to serve as a first representation of a first size of the garment and the second image to serve as a second representation of a second size of the garment, the first image and the second image being presented to a user in association with the garment.

17. The one or more non-transitory computer-readable storage media of claim 16, wherein the plurality of instructions are further executable by the one or more processors to determine, based at least on the signals, an elasticity of the garment placed onto the mannequin.

18. The one or more non-transitory computer-readable storage media of claim 16, wherein the plurality of instructions are further executable by the one or more processors to:

determine that at least one of the first attribute size combination or the second attribute size combination corresponds to dimensions of the garment based at least on reaching or exceeding a pressure threshold on one or more of the plurality of locations of the exterior surface of the robotic mannequin.

19. The one or more non-transitory computer-readable storage media of claim 16, wherein the plurality of instructions are further executable by the one or more processors to:
   determine, from the signals, that a placement of the garment on the robotic mannequin is deficient; and
   cause, responsive to the determining that the placement is deficient, an adjustment mechanism to adjust the placement of the garment on the mannequin.

\* \* \* \* \*